JOSEPH H. KLEPPINGER.

Improvement in Horse Powers.

No. 4,839. Reissued April 2, 1872.

Witnesses:

Henry A. Miller

C. L. Everts

Inventor

Joseph H. Kleppinger per Alexander Mason

Attorneys.

AM. PHOTO-LITHOGRAPHIC CO. N.Y. (OSBORNE'S PROCESS)

UNITED STATES PATENT OFFICE.

JOSEPH H. KLEPPINGER, OF CHERRYVILLE, PENNSYLVANIA.

IMPROVEMENT IN HORSE-POWERS.

Specification forming part of Letters Patent No. 79,074, dated June 23, 1868; reissue No. 4,839, dated April 2, 1872.

*To all whom it may concern:*

Be it known that I, JOSEPH H. KLEPPINGER, of Cherryville, in the county of Northampton and State of Pennsylvania, have invented a new and useful Improvement on Horse-Power; and I do hereby declare that the following is a full, clear, and exact description thereof, which will enable others skilled in the art to make and use the same, reference being had to the accompanying drawing forming part of this specification, in which—

Figure 1:
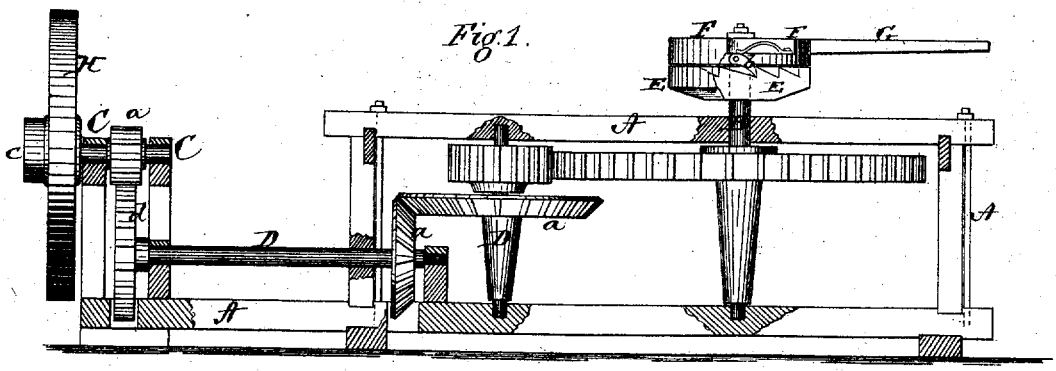
Figure 2:
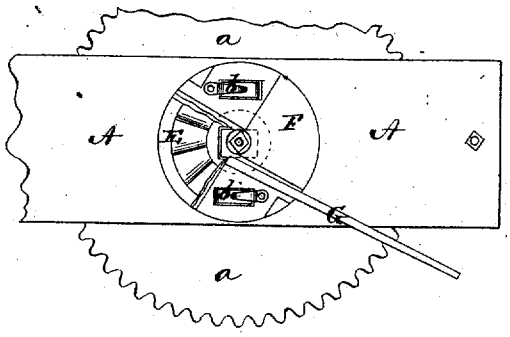

Figure 1 represents a side elevation, partly in section, of my improved horse-power. Fig. 2 is a detail plan or top view of the same.

Similar letters of reference indicate corresponding parts.

This invention relates to a new manner of arranging the mechanism for converting the working-power of horses or other animals into rotary motion for ordinary thrashing and other machines. The object of the invention is to equalize the motion of the driving-shaft, so that if the horses should not move quite regular, or should be slightly disturbed in their work, the machine should not also acquire such irregular motion, but should continue in equal motion and should move with the same velocity, even if the power applied should not move regular. The invention consists in the application of a fly-wheel, which is mounted on the same shaft on which the pulley moving the belt is mounted, and in the application of a pawl-and-ratchet wheel on the shaft, which receives its motion directly from the horses. The pawl is pivoted to a disk, to which the levers, whereto the horses are hitched, are secured, and as the horses move forward the pawl catches against one of the teeth of the ratchet-wheel and carries the shaft around. The fly-wheel gathers considerable of the power applied to the shaft, and if the horses should be detained in their motion it will carry its shaft around with it, and the ratchet-wheel then slips under the pawl.

A represents the frame of suitable construction and material. In the same are the bearings for the vertical driving-shaft B, and for the horizontal transmitting-shaft C, and for the intermediate shafts D D, which are, by means of suitable gear-wheels *a a*, connected with the same. On the upper part of the vertical driving-shaft B is mounted a disk or wheel, E, which has a toothed upper surface. F is a wheel turning loose on the upper end of the shaft B and resting upon the disk E. A pawl or pawls, *b*, are pivoted to the wheel F, and rest on the toothed face of E, as in Fig. 1. To the wheel F are secured the radial arms or levers G G, to which the horses are hitched. As the wheel F is turned by the horses its pawls catch against the teeth of the wheel E and carry the wheel E, and with it the shaft B around, and by the intermediate gearing the shaft C is also revolved. On the horizontal shaft C are mounted a fly-wheel, H, and the pulley *c*, from which motion is, by a suitable belt, transmitted to the machinery. The fly-wheel serves to equalize the motion of the shaft C and to collect the power, so that if the motion of the horses is at moments detained or suspended, the fly-wheel will still carry the shaft around with equal velocity, in which case the wheel E will slip under the pawls of the then stationary wheel F. Thus an equalized motion for the horse-power is produced.

Having thus fully described my invention, what I claim as new, and desire to secure by Letters Patent, is—

1. In horse-powers, the arrangement of a fly-wheel on the same shaft upon which the pulley moving the belt is mounted, substantially as and for the purposes herein set forth.

2. In horse-powers, the arrangement of a pawl-and-ratchet wheel on the shaft, which receives its motion directly from the horses, substantially as and for the purposes herein set forth.

3. The wheel E with the toothed face, loose wheel F with pawls *b*, and the fly-wheel H on the shaft of a horse-power, all arranged as specified.

In testimony that I claim the foregoing I have hereunto set my hand this 29th day of February, 1872.

JOSEPH H. KLEPPINGER.

Witnesses:

JOHN M. HOWE,

THOMAS M. GABLE.